Jan. 5, 1926.
G. W. BROWN
1,568,362
BALL BEARING FOR SHEAR TABLES
Filed March 16, 1925     4 Sheets-Sheet 1
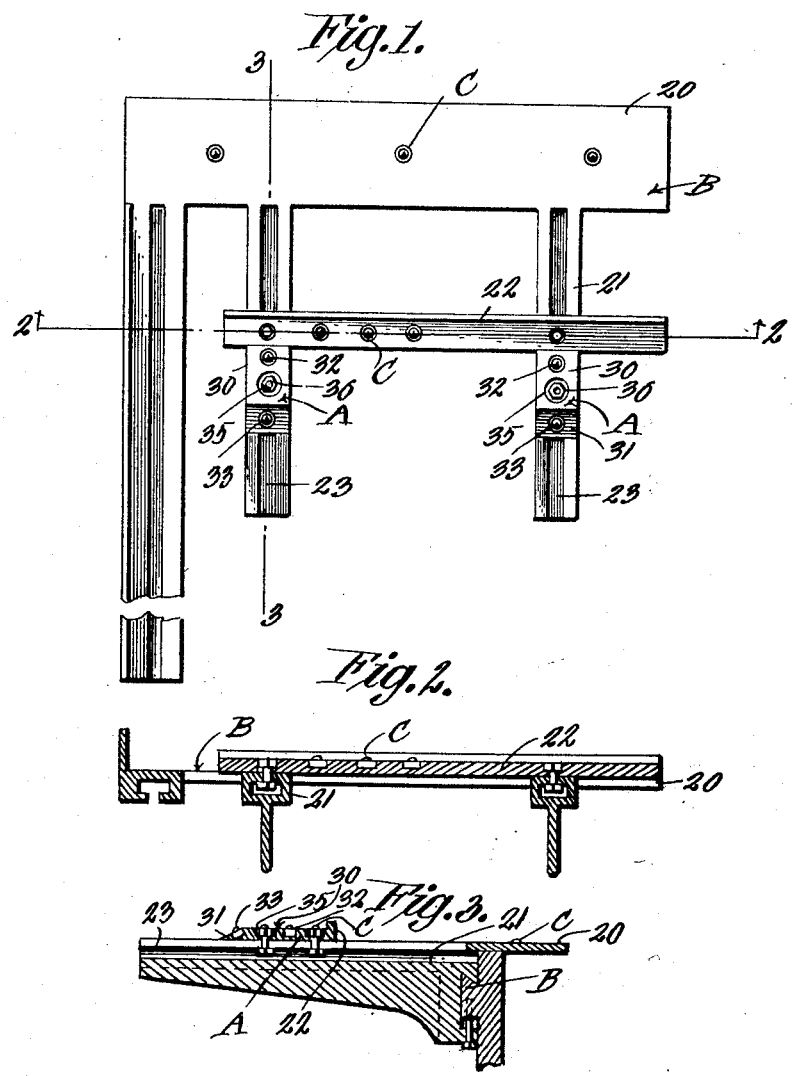
WITNESSES
Inventor
GLENNE W. BROWN
By Richard B. Owen, Attorney

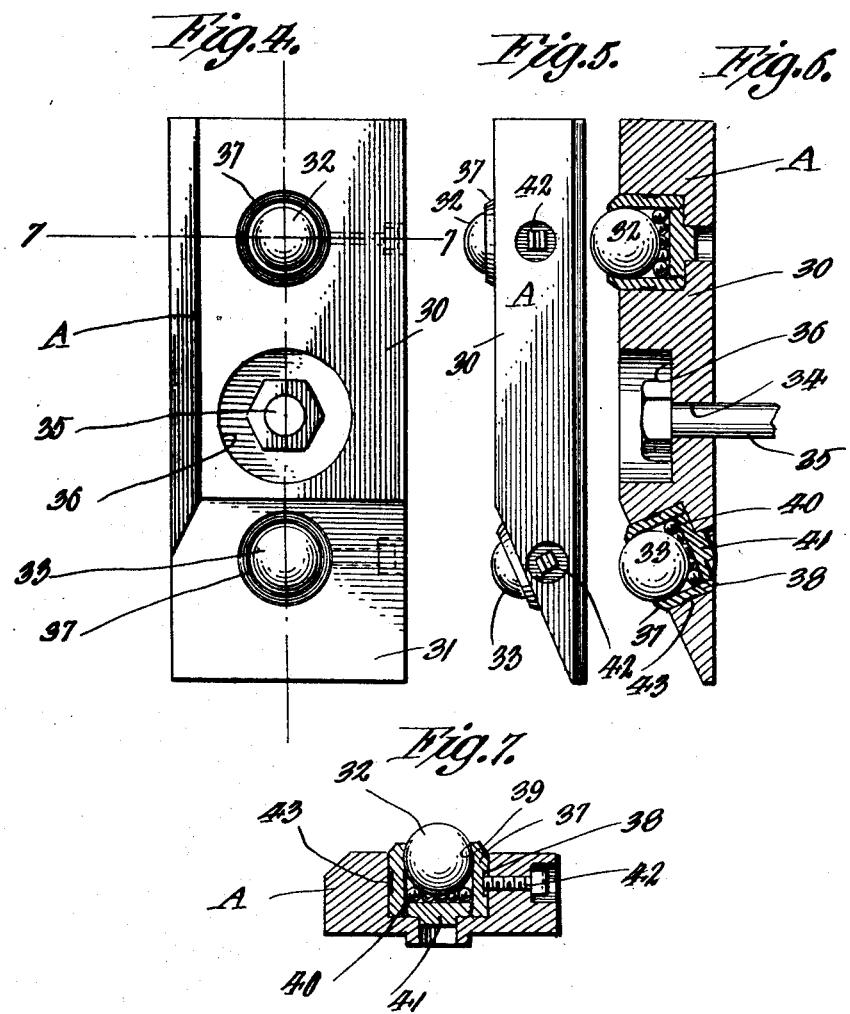

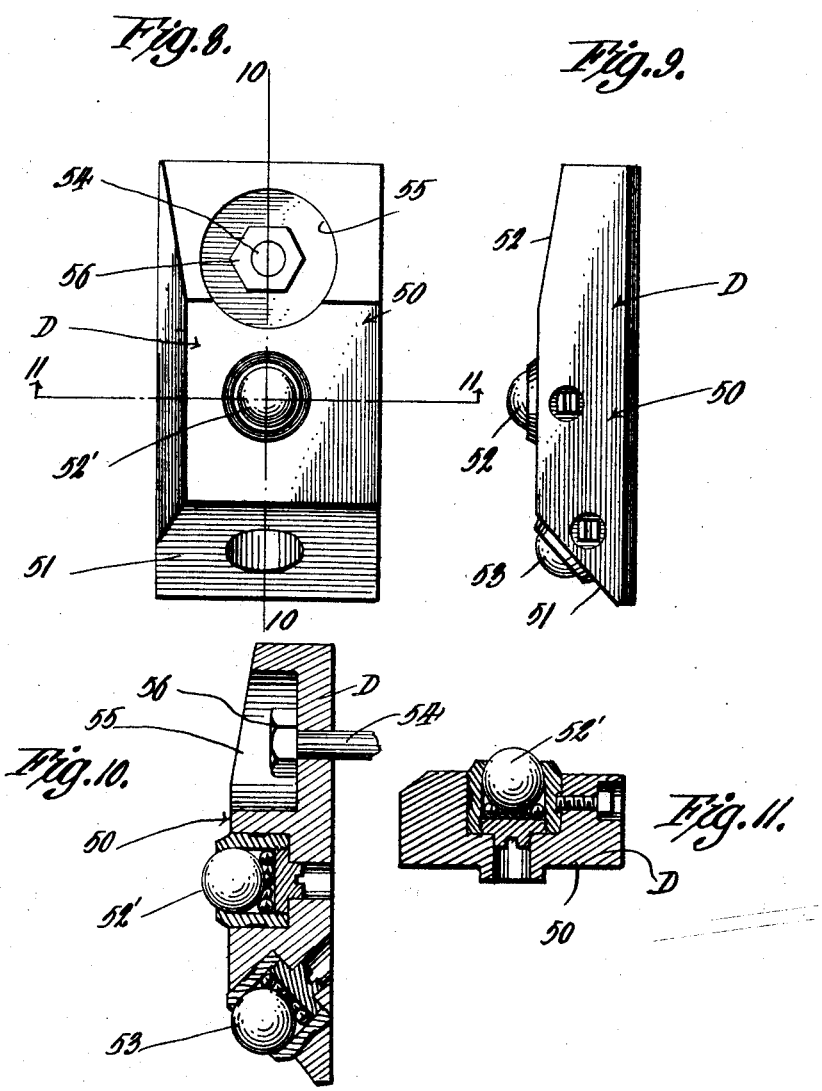

Jan. 5, 1926.  
G. W. BROWN  
1,568,362  
BALL BEARING FOR SHEAR TABLES  
Filed March 16, 1925  
4 Sheets-Sheet 4
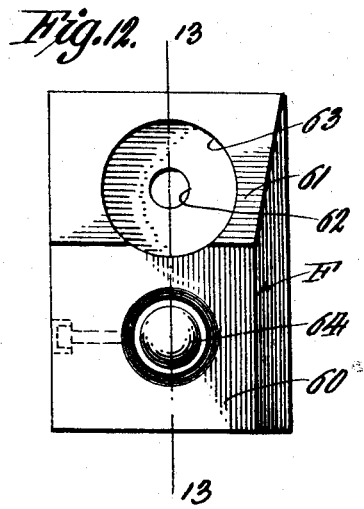
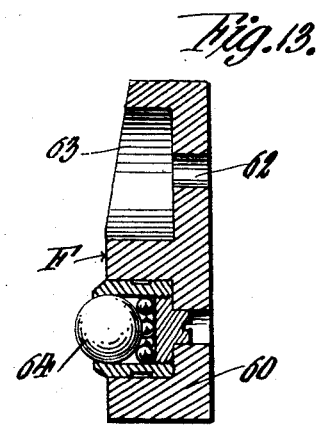
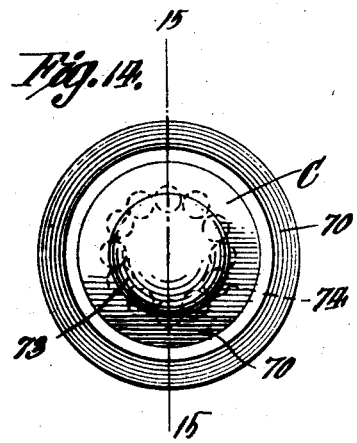
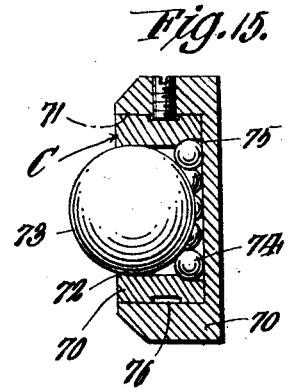
WITNESSES
Inventor  
GLENNE W. BROWN
By Richard... Attorney Patented Jan. 5, 1926.

1,568,362

UNITED STATES PATENT OFFICE.

GLENNE W. BROWN, OF HOBART, INDIANA.

BALL BEARING FOR SHEAR TABLES.

Application filed March 16, 1925. Serial No. 16,038.

*To all whom it may concern:*

Be it known that I, GLENNE W. BROWN, a citizen of the United States, residing at Hobart, in the county of Lake and State of Indiana, have invented certain new and useful Improvements in Ball Bearings for Shear Tables, of which the following is a specification.

This invention appertains to the handling of heavy objects and the primarily object of the invention is the provision of means for facilitating the turning and moving of sheet metal packs on the table of steel trimming shears to reduce the cost and labor involved in the trimming of the heavy packs.

In the large sheet metal mills of this country, the pieces of sheet steel are stacked one upon the other in what is commonly known as packs and these packs are placed upon large cutting shears to be cut in uniform lengths and widths. These packs weigh from 100 to 400 pounds according to the gage of the sheet metal and it is obvious that the handling of the packs is extremely difficult. After the packs have been cut, the sheets of steel are galvanized.

The cutting shears generally include a table top carrying spaced horns and a gage bar and the packs are pulled back against the gage bar to facilitate the evening up of the packs and to gage the cut.

It is very difficult to pick up the heavy packs and lay them on the shear horns, also difficult to push them over the horns and gage bar to the table and when lying flat on the iron table, it is almost impossible to pull these heavy packs back against the gage bar so as to even up the pieces of steel in the pack. After the pieces of steel have been evened up then it is difficult to push them back to the shears or knives on the back part of the table to have them sheared to a uniform width. After the knife cuts through on one side, this pack must be run back along the horns on which it is balanced and turned with the other end to the shears, pushed across the table and shaped at that end. Thus the process must continue until the pack has been sheared on all four sides, giving each and every sheet a uniform width and length.

In order to handle the heavy packs, the operators have been required to use a large amount of oil, so that they may slide the packs or push them more readily across the table to the shears and reduce the friction between the packs and the table top.

When oil has been used to reduce the friction between the pack and table top, the lowermost piece of sheet steel cannot be galvanized in view of the oil adhering thereto and thus this lower sheet is rendered unfit and has to be scraped. It has been figured, that when eight shears in a mill are used, forty tons of the sheet steel is sent to the scrap pile every two weeks solely on this account.

It is therefore another prime object of this invention to provide novel means incorporated with the gage horns, gage bar and table top to facilitate the easy manipulation of the packs, without the use of grease or oil, thereby eliminating the necessity of scraping of any of the sheet steel.

A further prime object of the invention is the provision of novel antifriction devices incorporated with the gage horns, gage bar and table top on which the pack is adapted to rest, the antifriction devices permitting the easy turning and handling of the pack on the table. A still further object of the invention is to provide an improved device of the above character, which will be durable and efficient in use, one that will be simple and easy to manufacture and one which can be incorporated with steel cutting shears at a minimum cost.

With these and other objects in view, the invention consists in the novel construction, arrangement and formation of parts, as will be hereinafter more specifically described, claimed and illustrated in the accompanying drawings, in which drawings:

Figure 1 is a plan view of the table top or sheet metal cutting shears, showing the gage horns and gage bar connected therewith, and illustrating the novel antifriction devices incorporated with the top, horns and the bar.

Figure 2 is a transverse section taken on the line 2—2 of Figure 1.

Figure 3 is a longitudinal section taken on the line 3—3 of Figure 1, illustrating the means of incorporating the antifriction devices in the gage bar and horn.

Figure 4 is an enlarged top plan view of one of the antifriction devices which is adapted to be connected with one of the gage horns.

Figure 5 is a detail edge elevation thereof.

Figure 6 is a longitudinal section through the said antifriction device taken on the line 6—6 of Figure 4.

Figure 7 is a detail transverse section through the antifriction device taken on the line 7—7 of Figure 4 and illustrating the means of holding the ball bearing in place.

Figure 8 is a plan view of a slightly modified form of the antifriction device.

Figure 9 is an edge elevation of the same.

Figure 10 is a longitudinal section through the friction device taken on the line 10—10 of Figure 8.

Figure 11 is a transverse section taken on the line 11—11 of Figure 8.

Figure 12 is a plan view of a still further modified form of the antifriction device.

Figure 13 is a longitudinal section through the same taken on the line 13—13 of Figure 12.

Figure 14 is a plan view of one of the anti-friction devices which can be incorporated with the gage bar and table top.

Figure 15 is a diametric section through the same taken on the line 15—15 of Figure 14.

Referring to the drawings in detail, wherein similar reference characters designate corresponding parts throughout the several views the letter A indicates one type of antifriction device which can be incorporated with the gage horns of cutting shears B, and C one type of antifriction device which can be incorporated with the gage bar and table top of the cutting shears.

The cutting shears B have been only illustrated to show the arrangement and position of the antifriction devices thereon and only a sufficient portion of the shears has been illustrated to show the use of the said antifriction devices. As clearly shown in Figures 1 to 3 inclusive the cutting shears C includes the table top 20 the forwardly extending spaced parallel disposed gage horns 21 and the gage bar 22, which is adjustably carried by the gage horns.

The antifriction device A for the gage horn 21 each include a guide block 30 of metal, which has its forward leading edge beveled to provide an inclined face 31 to facilitate the sliding of the sheet metal packs over the gage bar 22. The face 31 and the upper surface of the body portion of the block 30 are each provided with relatively large antifriction ball bearings 32 and 33 respectively and these ball bearings are fitted in the block 30 in a novel manner, as will be hereinafter more fully described. In order to facilitate the placing of the blocks 30 of the gage horns 21, the block intermediate the bearings 32 and 33 is provided with an opening 34 through which is adapted to extend a bolt 35, which is adapted to fit in the ordinary guides 23 formed in the gage horns 21. The upper surface of the block 30 is also provided with a relatively large recess 36 which communicates with the opening 34 so as to provide means for permitting the nut fitted upon the bolt 35 to rest below the outer face of the said block.

The means for holding the ball bearings 32 and 33 are identical in construction and each include a collar 37 which is adapted to fit in a recess 38 formed in the block and this collar has its outer end contracting as at 39 for snugly engaging the bearing to prevent the displacement thereof. Disposed within each of the collars 37 are a plurality of relatively small ball bearings 40 on which the large bearing is adapted to rest and if so desired the inner end of the collar can be closed by a threaded plug 41. The collar is prevented from being displaced from the recess 38 by means of an inwardly extending set screw 42 threaded into the block, the inner end of which is adapted to fit in an annular groove 43 in the outer surface of the collar. If desired hard grease can be packed within the collar 37 and it is obvious that owing to intimate contact of the contracted end 39 with the large bearing, that any grease which may be on the large bearing will be scraped off of the same, thereby preventing the placing of grease on the packs.

In use of the antifriction device A, the same are placed in contact with the forward edge of the gage bar 22 and it can be seen that when the packs are placed upon the gage horns 21 that the pack can be readily slid up over the gage bar onto the table.

It is also obvious that different types of anti-friction devices can be associated with the horns and in figures 8 to 11 inclusive I have shown another type D of antifriction device which is of substantially the same construction as the antifriction device A. As shown however, the antifriction device D comprises a solid block 50 having its forward and rear ends beveled to provide inclined faces 51 and 52 respectively. Now the body portion of the block 50 and the leading inclined face 51 have incorporated therewith the antifriction ball bearings 52' and 53 which are mounted therein in the same manner as the antifriction balls 32 and 33 are mounted in the block 30. In this form of antifriction device the retaining bolt 54 is placed in rear of ball bearings 52' and 53 and a recess 55 is formed in the block for the reception of the nut 56 on the bolt.

A still further form of antifriction device is illustrated in Figures 12 and 13 and this form is designated broadly by the reference character F and is susceptible for use not only on the gage horns but on other places of the steel cutting shears.

This antifriction device F comprises a body portion 60 having one end edge thereof beveled to provide an inclined face 51 which is provided with an opening 62 and a recess 63. It is obvious that the retaining bolts can be passed through the opening 62 and the nut therefore placed in the recess 63.

The body portion 60 of the antifriction device F has incorporated therewith a single large ball bearing 64 which is retained on the block in the same manner, as in the forms of the antifriction device heretofore described.

The antifriction devices C, as stated, are particularly adapted to be incorporated with the gage bar and at various needed points on the table top 20 and as shown these antifriction devices include a disk-shaped body 70 having the outer face thereof provided with a circular recess or depression 71 for the reception of a retaining annular-shaped collar 70′, the outer end of which can be contracted as at 72 for engaging the large ball bearing 73. This ball bearing 73 is adapted to rest upon relatively small ball bearings 74 and if so desired the inner periphery of the annular retaining ring 70′ can be provided with a groove 75 for providing a race for the said ball bearings 74. The outer periphery of the retaining ring or collar 70′ is provided with an annular groove 76. The inner end of a set screw 77 is adapted to fit in the groove 76 for normally retaining the ring or collar 70′ against displacement and this set screw is threaded into the body 70.

From the foregoing, it can be seen that after the pack has been slid up on the horns over the antifriction devices A, that the pack will engage the ball bearings or antifriction devices on the gage bar and table and thus the easy turning of the pack and the turning up of the sheet metal pieces thereof can be facilitated.

Changes in details may be made without departing from the spirit or the scope of this invention.

What I claim is new is:

1. The combination with steel sheet cutting shears including a table top, gage horns and a gage bar, of means for facilitating the moving of sheet metal packs over the gage bar onto the top including blocks connected with the gage horns in abutting relation to the gage bar, the blocks having inclined leading edges, and ball bearings incorporated with the body portions of the blocks and with the inclined leading edges thereof.

2. The combination with sheet steel cutting shears including a table top, gage horns, and a gage bar, of means for facilitating the moving of sheet metal packs from the gage horns over the gage bar and onto the top including blocks adjustably associated with the horns including beveled inclined leading faces, ball bearing races inserted in the body portions of the blocks and in the beveled leading faces thereof, and relatively large ball bearings fitted in the blocks and resting upon the said ball bearing races.

3. The combination with sheet metal cutting shears including a table top, gage horns and a gage bar, of means for facilitating the manipulation of sheet metal packs placed upon the shears and movement of the packs from the gage horns over the gage bars onto the top including ball bearing carrying blocks adjustably carried by the gage horns and provided with inclined leading edges, ball bearing blocks carried by the gage bar, and ball bearing blocks carried by the table top.

4. In an antifriction device for facilitating the manipulation of sheet metal cutting shears including a body having a recess in its upper surface, relatively small bearings fitted in the recess, a relatively large ball bearing fitted upon the first mentioned ball bearing, a retaining ring fitted in the recess for holding all of the ball bearings in place, the retaining ring having its outer end contracted for intimately engaging the outer surface of the relatively large ball bearing to scrape all foreign substances from the same, the retaining ring having an annular groove therein, and a set screw carried by the body for engaging in said groove.

5. The combination with sheet metal cutting shears including a table top, gage horns and a gage bar, of means provided with antifriction elements for facilitating the sliding of sheet metal packs from the gage horns over the gage bar onto the table top, said means comprising blocks secured on the gage horns and having inclined leading surfaces.

In testimony whereof I affix my signature.

GLENNE W. BROWN.